R. E. HELLMUND.
SYSTEM OF SPEED CONTROL FOR INDUCTION MACHINES.
APPLICATION FILED AUG. 10, 1918.

1,425,652.

Patented Aug. 15, 1922.
3 SHEETS—SHEET 2.

WITNESSES:
W. S. Reece
D. C. Davis

INVENTOR
Rudolf E. Hellmund
BY
ATTORNEY

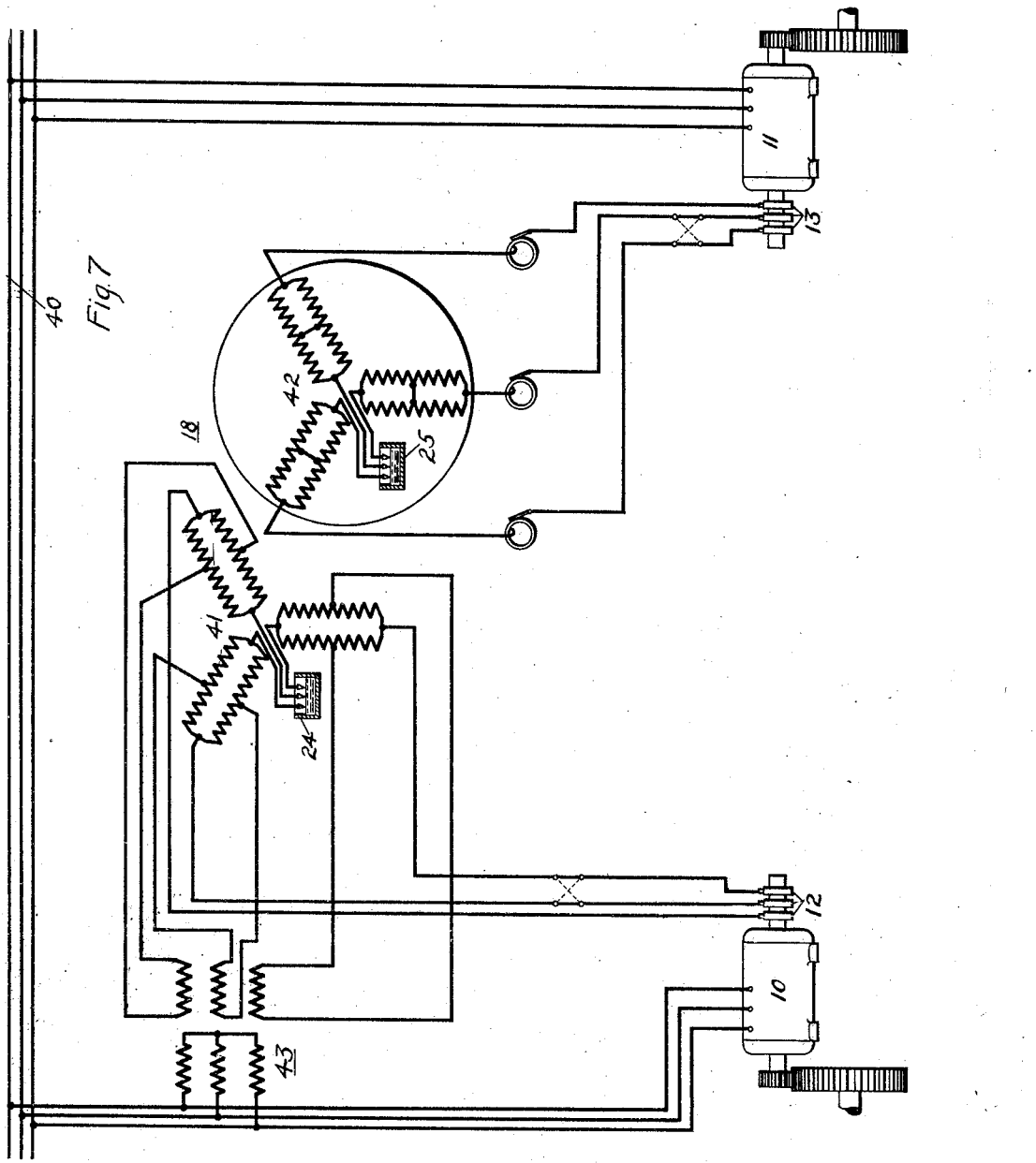

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF SPEED CONTROL FOR INDUCTION MACHINES.

1,425,652.     Specification of Letters Patent.     Patented Aug. 15, 1922.

Application filed August 10, 1918. Serial No. 249,333.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Speed Control for Induction Machines, of which the following is a specification.

My invention relates to systems of speed control for induction machines when operating as motoring or as recuperating machines, and it has for its object to provide a system of the type designated which shall permit operation at a number of running speeds and at relatively high efficiency, together with convenient transition means for passing from one speed to another.

Figure 1:
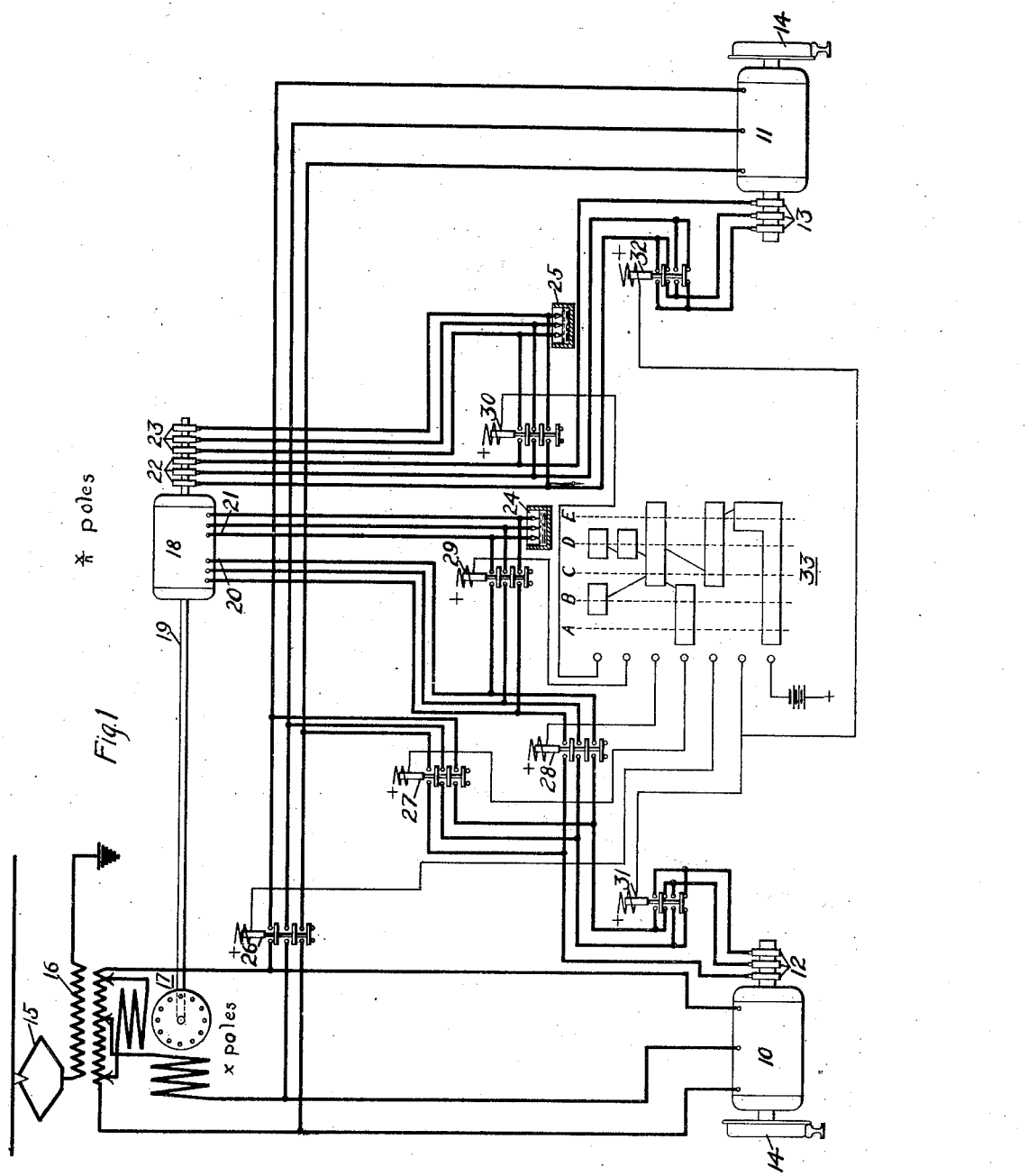

In the accompanying drawing, Fig. 1 is a diagrammatic view of a pair of induction motors, together with supply and control circuits, and other auxiliary apparatus embodying one form of my invention; Figs. 2 to 6, inclusive, are simplified diagrammatic views illustrating the connections shown in Fig. 1; and Fig. 7 is a view, similar to Fig. 1, and illustrating a modification of my invention.

In the application of induction motors to industrial uses, as, for example, in railway work, it is usual to employ induction motors in pairs, obtaining substantially one-half synchronous speed by cascade operation and substantially synchronous speed by direct connection to the line. It is frequently desirable to obtain an intermediate speed of three-fourths synchronism and, to this end, I find that a small auxiliary induction machine may conveniently be operated at substantially one-half its synchronous speed and the secondary windings of the main motors may thereupon be connected to the primary and secondary windings of said auxiliary machine. Under these conditions, substantially three-fourths of synchronous speed may be obtained in each of the main machines, and energy derived from the secondary members thereof may be transmitted through the auxiliary machine and returned to the source or otherwise utilized.

By reversal of the phase sequence between the auxiliary machine and the main machines, a speed increment of substantially one-fourth speed may be imparted to each of the main machines, resulting in operation at substantially five-fourths synchronous speed, these two desirable additional speeds being obtainable with an auxiliary machine having a capacity of substantially one-eighth of the two motors at a relatively high speed.

Referring to the drawing for a more detailed understanding of my invention, I show a pair of main induction motors at 10 and 11 in Fig. 1, each motor being provided with wound secondary rotors terminating in slip rings 12 and 13, respectively, and further being coupled to driving wheels, as shown at 14—14.

Energy for the operation of the motors 10 and 11 is shown as derived from a single-phase trolley 15, passed through a transformer 16 and converted into polyphase current by a suitable converter 17, shown as of the well known asynchronous type.

An auxiliary dynamo-electric machine 18 of the induction type is mechanically coupled to the rotor of the converter 17, as by a shaft 19, and is provided with terminals 20 at one end of its primary winding and with terminals 21 at the other end thereof. In like manner, the secondary winding of the machine 18 is provided with slip ring terminals 22 at one end thereof and with slip ring terminals 23 at the other end thereof. Suitable liquid rheostats 24 and 25 are connected to the terminals 21 and 23, respectively. The machine 18 preferably has one-half the number of poles of the machine 17, whereby the machine 18 runs at substantially one-half synchronous speed. The primary terminals of the motor 10 are connected directly to the converter 17 and the primary terminals of the motor 11 may be similarly connected through closure of a suitable switch 26. The secondary terminals 12 of the motor 10 may be connected to the primary terminals 20 of a machine 18 through a phase-sequence reversing switch 31 and a switch 28 and, in like manner, the secondary terminals 13 of the motor 11 may be connected to the terminals 22 of the machine 18 through a phase-reversing sequence switch 32.

The secondary terminals 12 of the machine 10 may be connected to the primary terminals of the machine 11 through a suitable switch 27, and the primary and secondary windings of the machine 18 may be respectively short-circuited by suitable switches 29 and 30, thus connecting the rheostats 24 and 25 directly to the secondary windings of the main motors, respectively.

The switches 26 to 32, inclusive, may be of any desired type, either manually, pneumatically or electromagnetically operated, the specific type of switch employed forming no part of the present invention. In Fig. 1, the switches are shown as of the electromagnetic type, being subject to the control of a manually operated controller 33 having five positions indicated as "A" to "E", inclusive.

Figure 2:
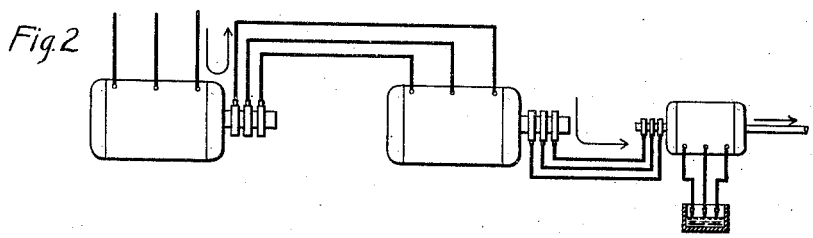
Figure 3:
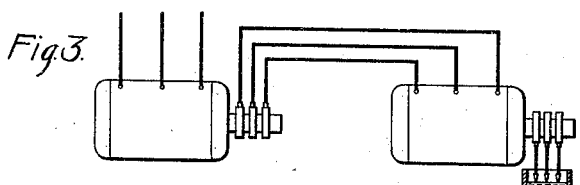

Having thus described the arrangement of a system embodying my invention, the operation is as follows. Upon moving the controller 33 to the position "A," the switch 27 is closed to connect the main machines in cascade and to further connect the auxiliary machine 18 in cascade therewith all as indicated in Fig. 2, the energy flow being as indicated by arrows. By this arrangement, a speed considerably under one-half synchronism may be secured and said speed may be gradually raised to substantially one-half synchronism by manipulation of the rheostat 25. The controller 33 is next moved to the position "B" to close the switch 30 and eliminate the machine 18 from the active circuit, producing the simple concatenation connection of Fig. 3 and giving the maximum concatenation speed of substantially one-half synchronous speed.

Figure 4:
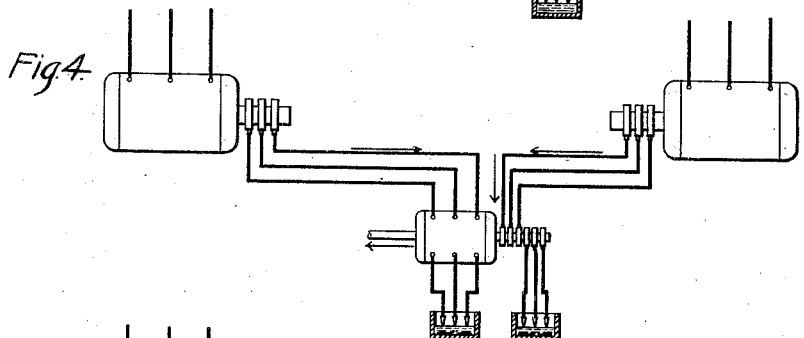

The controller 33 is next moved to the position "C" to open the switches 27 and 30 and close the switches 28 and 26, whereupon the primary windings of both main motors are connected directly to the source and the secondary winding of the motor 10 is connected to the stator winding of the machine 18, whereas the secondary winding of the machine 11 is connected to the rotor windings of the machine 18, all as indicated in Fig. 4, both the resistors 24 and 25 also being in circuit. The machine 18, having substantially one-half the number of poles of the machine 17, tends to produce a total frequency, i. e., sum of stator and rotor frequencies, of substantially one-half of the supply frequency. Since the machines 10 and 11 run at about the same speed, their secondary frequencies must be about equal. Since, further, the sum of the secondary frequencies is one-half line frequency, each must be about one-fourth line frequency, with resistance cut out. While resistance is in circuit, the action of the rheostats 24 and 25 is reflected back through the machine 18, however, to the secondary members of the machines 10 and 11, causing more slip therein than would otherwise be the case and permitting operation, for example, at five-eighths of synchronous speed. The resistors 24 and 25 are thereupon gradually reduced in value until a running speed of three-fourths synchronism is secured.

Figure 5:
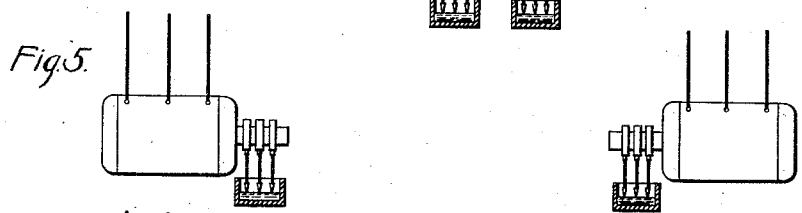
Figure 6:
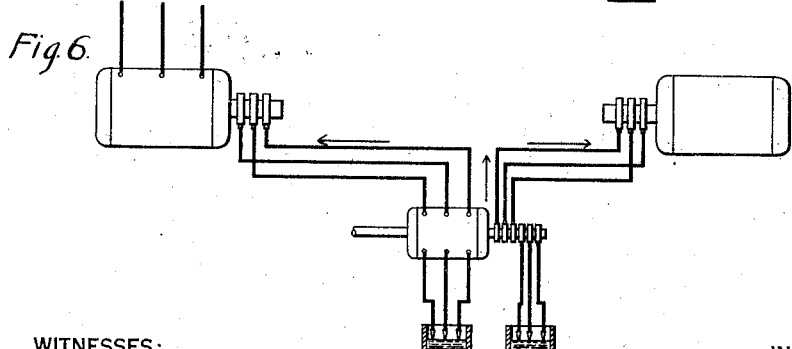

The controller 33 is next moved to the position "D," closing the switches 29 and 30, shunting both the stator and rotor windings out of circuit and connecting the machines 10 and 11 directly to the resistors 24 and 25. Said resistors having been increased in value, operation at slightly above three-fourths synchronism may be secured, and the gradual elimination of the resistors 24 and 25 now brings the main machines to synchronism minus slip or substantially synchronism, as indicated in Fig. 5.

If over-synchronous operation is desired, the controller 33 is next moved to the position "E" to open the switches 27 and 30 and to reverse the phase sequence between the machines 10 and 18 and 11 and 18, respectively, by the energization of the switches 31 and 32. Under these conditions, the substantially one-fourth-frequency rotating field supplied by the machine 18 to the secondary members of the motors 10 and 11 is in opposition to the stator fields therein, causing the main machines 10 and 11 to run at over-synchronous speeds, energy being transmitted from the machine 17, through the shaft 19, to the machine 18 for supply to the main-motor secondary members, as distinguished from the operation of Fig. 4, wherein energy flows from the secondary members of the main motors through the machine 18 and returns to the supply.

While I have described my invention only in connection with motoring operation, it will be obvious to those skilled in the art that the different connections thereof are equally susceptible of application in connection with regeneration.

In the system of Fig. 1, the machine 18 is indicated as being driven by the converter but it occasionally happens that the converter is not available or has not sufficient capacity to drive said machine and, under these conditions, the machine may be rendered self-driving, as indicated in Fig. 7. A pair of main motors 10 and 11, as before, derive their energy from a three-phase supply system 40. An auxiliary machine 18 is employed having a double-wound stator member 41 and a double-wound rotor member 42, said double windings being of the form employed for imparting two different pole numbers to a winding, as in the internal cascade motor. Energy is derived from the source 40 through a suitable transformer 43 and is supplied to the mid-points of opposite sides of the respective phase divisions of the stator 41, as indicated. The corresponding opposite points of the respective phase divisions of the rotor winding 42 are interconnected, whereupon the machine 18 runs, as a motor, at the speed determined by its higher pole number. The rotor terminals 12 and 13 of the machines 10 and 11 are connected, respectively, to corresponding terminals of the stator and rotor windings 41 and 42, and the resistors 24 and 25 are similarly connected to the remaining terminals of said two windings, whereupon the machine 18 functions in accordance with its low pole number, as does the machine 18 of Fig. 1.

Throughout this specification, I have described my invention as embodied in an auxiliary machine operating at substantially one-half its synchronous speed, thus imparting one-fourth synchronous speed to the rotating fields imparted to the main secondary circuits. Obviously, other relative frequencies may be developed in the auxiliary machine, resulting in the production of one-sixth or any other desired portion of said frequency in the secondary members of the said machines.

While I have shown my invention in two of its preferred forms, it will be obvious to those skilled in the art that it is not so limited but is susceptible of still other minor changes and modifications without departing from the spirit thereof, and I desire, therefore, that only such limitations shall be placed thereupon as are imposed by the prior art or are specifically set forth in the appended claims.

I claim as my invention:

1. The combination with a source of alternating current, of two main induction machines, an auxiliary induction machine embodying independent primary and secondary windings, means for connecting the primary windings of said main machines to said source, means for connecting the secondary windings of said main machines to the primary and secondary windings of said auxiliary machine, respectively, in such manner that the auxiliary machine either delivers electric energy to both of the main machines or absorbs electric energy from both of the main machines, and means independent of said connections for fixing the speed of said auxiliary machine.

2. The combination with a source of alternating current, of two main induction machines, an auxiliary induction machine, means for connecting the primary windings of said main machines to said source, means for connecting the secondary windings of said main machines to the primary and secondary windings of said auxiliary machine, respectively, means independent of said connections for fixing the speed of said auxiliary machine, and means for adjusting the currents supplied to said auxiliary machine.

3. The combination with a source of alternating current, of two main induction machines, an auxiliary induction machine, means for connecting the primary windings of said main machine to said source, means for connecting the secondary windings of said main machines to the primary and secondary windings, respectively, of said auxiliary machine, and means for driving said auxiliary machine at $\frac{1}{n^{th}}$ of its speed, if connected directly to said source, so that the secondary field of said main motors rotate co-directionally with the primary fields thereof, whereby a speed of substantially $\frac{1}{2n^{th}}$ under synchronism is imparted to each of said main machines.

4. The combination with a source of alternating current, of two main induction machines, an auxiliary induction machine, means for connecting the primary windings of said main machine to said source, means for connecting the secondary windings of said main machine to the primary and secondary windings, respectively, of said auxiliary machine, and means for driving said auxiliary machine at $\frac{1}{n^{th}}$ of its speed, if connected directly to said source, so that the secondary fields of said main motors rotate co-directionally with the primary fields thereof, whereby a speed of substantially $\frac{1}{2n^{th}}$ under synchronism is imparted to each of said main machines, and means for independently adjusting the currents supplied from said main machines to said auxiliary machine.

5. The combination with a source of alternating current, of two main induction machines, an auxiliary induction machine, means for connecting the primary windings of said main machine to said source, means for connecting the secondary windings of said main machines to the primary and secondary windings, respectively, of said auxiliary machine, and means for driving said auxiliary machine at $\frac{1}{n^{th}}$ of its speed, if connected directly to said source, so that the secondary fields of said main motors are in opposition to the primary fields thereof, whereby a speed of substantially $\frac{1}{2n^{th}}$ over synchronism may be imparted to each of said main machines.

6. The combination with a source of alternating current, of two main induction machines, an auxiliary induction machine, means for connecting the primary windings of said main machine to said source, means for connecting the secondary windings of said main machines to the primary and secondary windings, respectively, of said auxiliary machine, means for driving said auxiliary machine at $\frac{1}{n^{th}}$ of its speed, if connected directly to said source, so that the secondary fields of said main motors rotate in opposition to the primary fields thereof, whereby a speed of substantially $\frac{1}{2n^{th}}$ over synchronism is imparted to each of said main machines, and means for independently adjusting the currents supplied from said main machines to said auxiliary machine.

7. The combination with a source of alternating current, of a phase-converter of the dynamo-electric type connected thereto, whereby polyphase alternating currents may be derived from said source, two main induction machines and an auxiliary induction machine, said auxiliary induction machine being mechanically coupled to said phase-converter and being driven thereby at a speed other than its substantially synchronous speed, if connected directly to said source, means for supplying said polyphase alternating currents to the primary windings of said main machines, and means for connecting the secondary windings of said main machines to the primary and secondary windings, respectively, of said auxiliary machine, whereby said main machines are caused to operate at speeds other than their inherent synchronous speed minus slip, as determined by the frequency of said source.

8. The combination with a source of alternating current, of a phase-converter of the dynamo-electric type connected thereto, whereby polyphase alternating currents may be derived from said source, two main induction machines and an auxiliary induction machine, said auxiliary induction machine being mechanically coupled to said phase-converter and being driven thereby at a speed other than its substantially synchononous speed, if connected directly to said source, means for supplying said polyphase alternating currents to the primary windings of said main machines, means connecting the secondary windings of said main machines to the primary and secondary windings, respectively, of said auxiliary machine, whereby said main machines are caused to operate at speeds other than their inherent synchronous speed minus slip, as determined by the frequency of said source, and means for varying the currents flowing between said main machines and said auxiliary machine.

9. The combination with a source of alternating current, of a phase-converter of the dynamo-electric type connected thereto, whereby polyphase alternating currents may be derived from said source, two main induction machines and an auxiliary induction machine, said auxiliary induction machine being mechanically coupled to said phase-converter and being driven thereby at substantially one-half its substantially synchonous speed if connected directly to said source, means for supplying said polyphase alternating currents to the primary windings of said main machines, and means for connecting the secondary windings of said main machines to the primary and secondary windings, respectively, of said auxiliary machine, whereby said main machines may be caused to operate at substantially three-fourths or substantially five-fourths of their inherent synchronous speed minus slip, as determined by the frequency of said source.

10. The combination with a source of alternating current, of a phase-converter of the dynamo-electric type connected thereto, whereby polyphase alternating currents may be derived from said source, two main induction machines and an auxiliary induction machine, said auxiliary induction machine being mechanically coupled to said phase-converter and being driven thereby at substantially one-half its substantially synchronous speed if connected directly to said source, means for supplying said polyphase alternating currents to the primary windings of said main machines, means for connecting the secondary windings of said main machines to the primary and secondary windings, respectively, of said auxiliary machine, whereby said main machines may be caused to operate at substantially three-fourths or substantially five-fourths of their inherent synchronous speed minus slip, as determined by the frequency of said source, and means for varying the currents flowing between said main machines and said auxiliary machine.

11. The combination with a source of alternating current, of two main polyphase induction dynamo-electric machines, an auxiliary polyphase induction-type dynamo-electric machine, means for driving said auxiliary dynamo-electric machine, at a speed radically different from its inherent synchronous speed, as determined by the frequency of said source, means for connecting the primary windings of said main machines to said source, means for connecting the secondary windings of said main machines to the primary and secondary windings of said auxiliary machine, respectively, and means for reversing the phase-sequence between said main machines and said auxiliary machine.

12. The combination with a source of alternating current, of two main polyphase induction dynamo-electric machines, an auxiliary polyphase induction type-dynamo-electric machine, means for driving said auxiliary dynamo-electric machine at a speed radically different from its inherent synchronous speed, as determined by the frequency of said source, means for connecting the primary windings of said main machines to said source, means for connecting the secondary windings of said main machines to the primary and secondary windings of said auxiliary machine respectively, means for reversing the phase-sequence between said main machines and said auxiliary machine, and means for adjusting the current flow between said main machines and said auxiliary machine.

13. The combination with a source of alternating current, of two main induction machines, an auxiliary induction machine embodying relatively rotatable primary and secondary windings, means for connecting the primary windings of the main machines to said source, and means for connecting the secondary windings of the main machines to the primary and secondary windings of the auxiliary machine, respectively, in such manner that the auxiliary machine either delivers electric energy to both of the main machines or absorbs electric energy from both of the main machines.

14. The combination with a source of alternating current, of two main induction machines, auxiliary induction means embodying a plurality of windings, means for connecting the primary windings of the main machines to said source, and means for connecting the secondary windings of the main machines to different windings of the auxiliary induction machine, respectively, in such manner that the auxiliary machine either delivers electric energy to both of the main machines or absorbs electric energy from both of the main machines.

15. The combination with a source of alternating current, of two main induction machines, an auxiliary induction machine embodying relatively rotatable primary and secondary windings, means for connecting the primary windings of the main machines to said source, means for connecting the secondary windings of the main machines to the primary and secondary windings of the auxiliary machine, respectively, in such manner that the auxiliary machine either delivers electric energy to both of the main machines or absorbs electric energy from both of the main machines, and means for fixing the speed of said auxiliary machine.

16. The combination with a source of alternating current, of two main induction machines, an auxiliary induction machine, means for connecting the primary windings of said main machines to said source, means for connecting the secondary windings of said main machines to the windings of said auxiliary machine, means independent of said connections for fixing the speed of said auxiliary machine, and means for adjusting the currents supplied to said auxiliary machine.

17. The combination with a source of alternating current, of two main induction machines, an auxiliary induction machine, means for connecting the primary windings of said main machines to said source, means for connecting the secondary windings of said main machines to the different windings of said auxiliary machine, means independent of said connections for fixing the speed of said auxiliary machine, and means for adjusting the currents supplied to said auxiliary machine.

18. The combination with two main induction machines having primary and secondary windings, means for connecting said primary windings in parallel relation, an auxiliary induction machine having primary and secondary windings, said last-mentioned primary and secondary windings being connected, respectively, to the secondary windings of said main induction machines in such manner that said auxiliary machine tends to rotate at a speed corresponding to the sum of the speeds of rotation of its primary and secondary fields, and a translating device for interchanging mechanical energy with said auxiliary machine and for controlling the speed of the same.

19. The combination with two main induction machines having primary and secondary windings, means for connecting said primary windings in parallel relation, auxiliary induction-machine means including wound stator and rotor elements connected, respectively, to the secondary windings of said main induction machines in such manner that said rotor element tends to rotate at a speed corresponding to the sum of the frequencies in said secondary windings, and a translating device for interchanging mechanical energy with said auxiliary means and for controlling the speed of said rotor element.

20. The method of operating a pair of main induction machines in conjunction with a source of polyphase alternating current and an auxiliary induction machine, said auxiliary machine being driven at a speed other than its synchronous speed, as determined by the frequency of said source, which comprises, at times, connecting the primary windings of said main machines to said source and connecting the secondary windings of said main machines to the primary and secondary windings of said auxiliary machine, respectively, in such phase-sequence as to produce under-synchronous operation of said main machines and, at other times, close-circuiting the secondary windings of the main machines.

21. The method of operating a pair of main induction machines in conjunction with a source of polyphase alternating current and an auxiliary induction machine, said auxiliary machine being driven at a speed other than its synchronous speed, as determined by the frequency of said source, which comprises, at times, connecting the primary windings of said main machines to said source and connecting the secondary windings of said main machines to the primary and secondary windings of said auxiliary machine, respectively, in such phase-sequence as to produce under-synchronous operation of said main machines and, at other times, reversing the phase-sequence between said main machines and said auxiliary machine, whereby said main machines are caused to operate at over-synchronous speed.

22. The method of operating a pair of main induction machines in conjunction with a source of polyphase alternating currents and an auxiliary induction machine, said auxiliary machine being driven at substantially one-half its synchronous speed, as determined by the frequency of said source, which comprises, at times, connecting the primary windings of said main machines to said source and connecting the secondary windings of said main machines to the primary and secondary windings of said auxiliary machine, respectively, in such phase-sequence as to produce substantially three-fourths synchronous speed in said main motors and, at other times, reversing the phase-sequence between said auxiliary machine and said main machines, whereby said main machines are caused to operate at substantially five-fourths of synchronous speed.

In testimony whereof, I have hereunto subscribed my name this 31st day of July, 1918.

RUDOLF E. HELLMUND.